Oct. 15, 1946.      F. D. BRADDON ET AL      2,409,188
ERECTION CONTROLLING DEVICE FOR GYROSCOPES
Filed Aug. 7, 1941      2 Sheets-Sheet 2
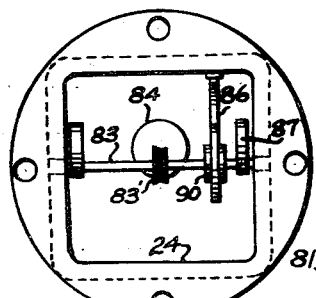
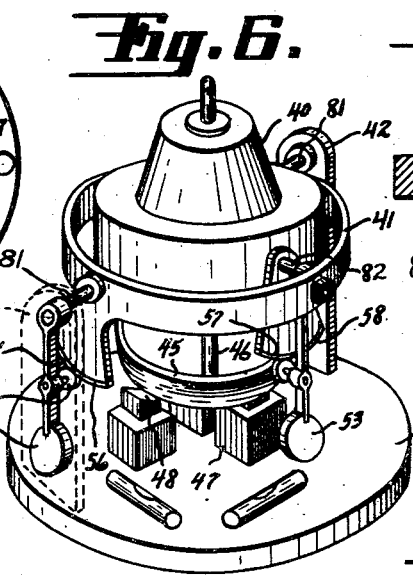
INVENTORS,
F. D. BRADDON and S. KELLOGG, 2nd
BY
Herbert H. Thompson
THEIR ATTORNEY Patented Oct. 15, 1946

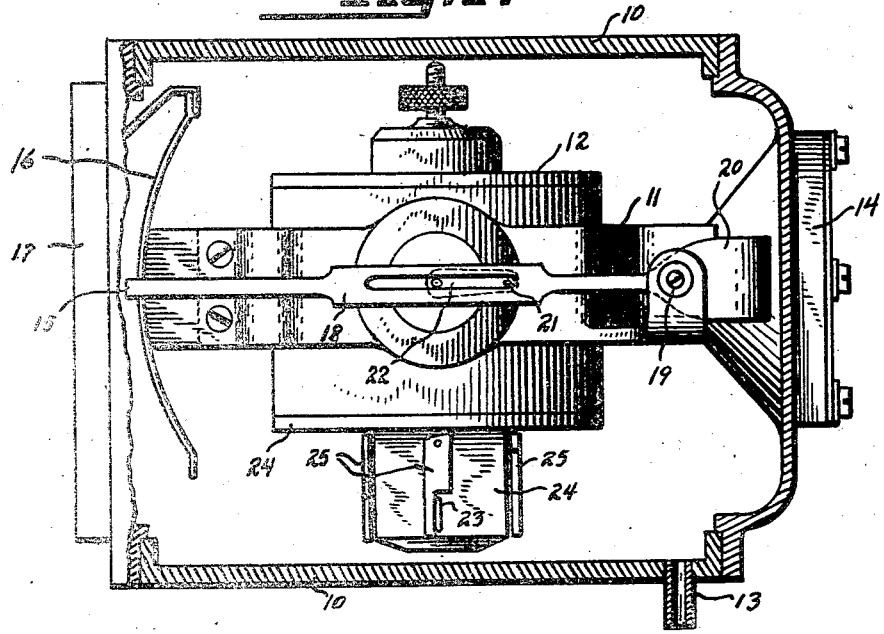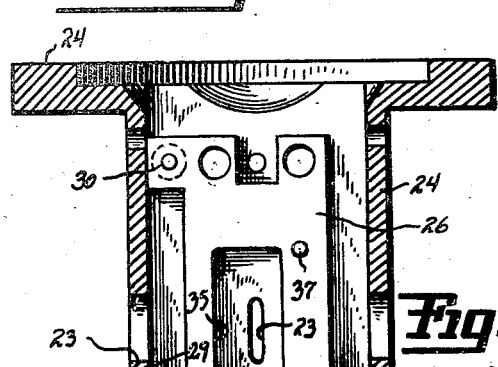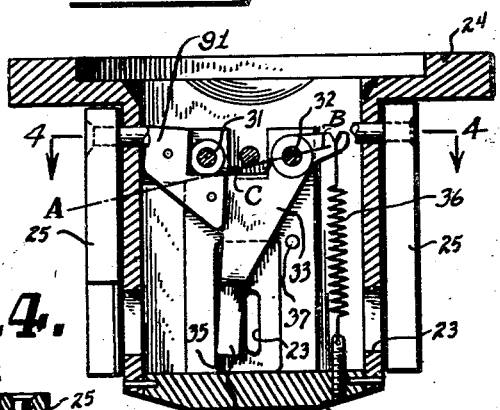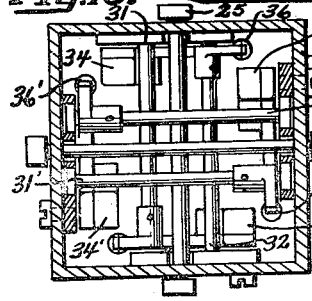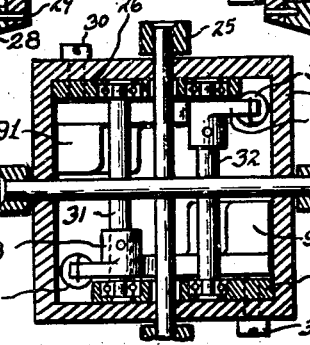

2,409,188

UNITED STATES PATENT OFFICE 2,409,188

ERECTION CONTROLLING DEVICE FOR GYROSCOPES

Frederick D. Braddon, Babylon, and Spencer Kellogg, 2d, Rye, N. Y., assignors to Sperry Gyroscope Company, Inc., Brooklyn, N. Y., a corporation of New York Application August 7, 1941, Serial No. 405,740

16 Claims. (Cl. 74—5)

This invention relates to erecting devices for maintaining a gyroscope of the three degree of freedom type truly vertical. It therefore has primary application to gyro-verticals or gyroscopic artificial horizons to which type of instrument it is shown as applied although it also has application to directional gyroscopes.

The primary object of the invention is to prevent the usual erecting means employed for gyro-verticals, such as used in artificial horizon instruments, from causing deviation when the instrument and the erecting means thereon are subjected to the influence of horizontally directed acceleration such as due to either a change in heading, or turn, or change in velocity of the craft on which the instrument is mounted.

One of the features of the invention consists in employing a normally ineffective pendulously supported element for obtaining the desired control over the effectiveness of the gyro-vertical erecting means.

Another object of the invention is to employ an erecting control device the operation of which depends on the force in excess of normal gravity which acts on it as a result of lateral acceleration of the craft on which the instrument is carried.

Another feature of the invention resides in the use of a gravitationally responsive means, balanced in a normal inoperative position against the force of gravity, which is operated by an increase in the total force thereon, due to such as horizontally directed acceleration of the gyro-vertical instrument, to render the erecting means temporarily ineffective.

A further feature of the invention is contained in the provision for mounting the erecting control device within the interior of the erector case in the type of gyro-vertical employing reactive air jet erecting means.

Other objects, features and structural details of the invention will be apparent from the following description when read in connection with the accompanying drawings, wherein Fig. 1 is a side elevation of a gyro-vertical embodying the present invention as utilized in an artificial horizon instrument.

Fig. 2 is an enlarged vertical cross-section view of the portion of the gyro-vertical shown in Fig. 1 constituting the erector case.

Fig. 3 is a view similar to Fig. 2 in which one of the erecting means controlling devices are shown within the erector case in its normal inoperative position.

Fig. 4 is a cross-section view taken on line 4—4, Fig. 3.

Fig. 5 is a view in elevation showing in detail the specific shape of the pendulous blocking element illustrated in the form of the invention depicted in Figs. 1 to 4, inclusive.

Fig. 6 is a perspective view of a gyro-vertical in which electromagnetic erecting means are employed.

Fig. 7 is a side elevation, partly in section, of the erecting means controlling device employed with the type of gyro-vertical shown in Fig. 6, the same being shown in a normal inoperative position.

Fig. 8 is a view similar to Fig. 7, with the controlling device in an operative position.

Fig. 9 is a wiring diagram applicable to the form of the invention shown in Figs. 6 to 8, inclusive; and Fig. 10 is a vector diagram illustrating the obtained resultant force, due to the increase in total force acting on the instrument, required to effect operation of the erecting control device.

Fig. 11 shows a detail modification of the form of the invention illustrated in Figs. 2 to 5 inclusive.

Fig. 12 is a plan view of the form of erection attachment shown in Fig. 11.

Fig. 13 is a cross-section similar to Fig. 4 of a modified form of the invention.

In the embodiment of the invention illustrated in Fig. 1, the improved gyro-vertical, shown, is mounted within an outer enclosure or casing 10 such as employed with conventional artificial horizon instruments. The gyro-vertical is universally and neutrally mounted within the casing 10 on fore and aft major horizontal pivots and athwartship horizontal minor pivots by means of gimbal ring 11 within which the rotor bearing case 12 of the gyroscope is situated. The rotor for the gyro-vertical is entirely enclosed within the case 12, in the present instance, the same being spun about a vertical axis by means of suitably directed air jets. In the form of the invention illustrated, air is withdrawn from the air-tight casing 10 by suitable suction means connected to the pipe 13. Also, air is admitted to the interior of the rotor bearing casing 12 through suitably provided channels in the gimbal ring 11 from the filter containing inlet defining portion 14. The air passing through the instrument is employed to both drive the rotor of the gyroscope and to exert the reactive force or torque required to maintain the rotor element of the gyro-vertical normally erect.

The conventional artificial horizon instrument shown in Fig. 1 includes the usual horizon bar 15, mask 16, window 17 provided in casing 10, slotted long lever 18 pivoted at 19 to the extended side of the gimbal ring 11, the counterweight 20 for the lever 18 and bar 15, and the slot cooperating pin 21 on arm 22 fixed to the exterior of the rotor bearing case 12. Also, the gyro-vertical includes the gyroscopic rotor element and the rotor bearing case therefor which is mounted in neutral equilibrium and supported with three degrees of freedom in the gimbal ring 11 on the perpendicularly disposed major and minor horizontal axes.

In the gyro-vertical shown in Fig. 1, the erecting means are provided by reactive air jets issuing from ports 23 contained in the erector housing or case 24 which is suitably secured to the lower portion of the rotor bearing case 12. The ports 23 are arranged in oppositely disposed pairs for both the fore and aft axis and the athwartship axis of the gyro-vertical, as is well known in the art. Gravitationally responsive means in the form of pendulums 25 are provided for each of the ports 23 for controlling the erecting effort or the torque exerted by the air issuing therefrom. Opposite pendulums 25 are secured to a common shaft, the respective perpendicularly arranged shafts being rotatably mounted in the side walls of the erector housing 24. The pendulums 25 which depend from the exterior portion of the housing 24 form blades which normally bisect the respective ports 23, when the spin axis of the gyroscopic rotor element is in a properly erected position, so that the air exhausting from the erector case through the ports issues in jets that are balanced about all axes, the same consequently exerting no erecting torque on the gyro-vertical. When the rotor of the gyro-vertical tilts, the reactive effect of the air jets is unequalized at the ports to obtain thereby a directed erecting torque which causes the rotor to return to an erected position.

In the form of the invention shown in Figs. 1 to 4, inclusive, the depending body of the erector housing 24 is constructed in a square shape, the four exterior and interior walls of the hollow body being flat. The controlling devices for the gyro-vertical, in the instant case, are suitably contained within the interior of the erector housing or case 24. The same include a supporting bracket structure formed of upwardly extending plates 26 and 27 fixed to the base 28 of the housing 24. Pins 29 and screws 30, or other suitable means, are employed in mounting this portion of the unit within and in proper relation to the main body of the erector housing or case 24. The plate supports 26 and 27, as illustrated in mounted position, Figs. 2, 3 and 4, closely fit against the interior faces or oppositely disposed walls in the housing, the same being positioned in parallel relationship and providing end bearing members for the spaced shafts 31 and 32 to which the auxiliary pendulums 33 are respectively secured. In the form of the invention here described, the improved devices are effective to exert control over the erecting means situated along the fore and aft axis of the gyro-vertical and thereby to render the erecting means ineffective when the same is erroneously brought into operation by a change in heading of a moving craft in which the gyro-vertical instrument is mounted. The same devices are equally effective in controlling the athwartship located erecting means, by duplication of parts and arrangement of the same about this noted axis, such an arrangement being illustrated in Fig. 13 which is a cross-section similar to Fig. 4, and in which two pairs of auxiliary shutters or pendulums are shown, acting about both the fore-and-aft and transverse axes, the pendulums being numbered the same as in Fig. 4, except that the additional pair of pendulums are primed. By the inclusion of such additional control devices, of the same construction, the effect of erroneous operation of the erecting means caused by a change in velocity of a moving craft containing the gyro-vertical may be obviated. One of the gravitationally responsive means or pendulums 33 is provided for each of the ports 23 through which the reactive air jets issue. Each pendulum is shown in the form of a T having a downward portion 34 which constitutes a shutter for the adjacent port 23 and operates between the walls of a defining slot 35 contained in the respective supporting plates 26 and 27, the same providing a blocking means by which the passage of air through the ports 23 may be prevented. Referring to the pendulum on shaft 32 specifically (see Fig. 3), the pivotal axis 32 of said pendulum lies to the right of the center of the T, therefore to the right of the center of gravity, the left side of the T being weighted as shown at 91, the center of gravity also being somewhat below shaft 32 but well above shutter 34. As clearly shown in Fig. 3, shutter 34 is normally maintained in an inoperative position by means of a balancing spring 36, one end of which is secured in position to the base 28 of the supporting structure and the other of which is connected to an extending arm of the element 33. Spring 36 normally lightly holds shutter 34 to the left in Fig. 3, thereby lifting slightly the center of gravity of the pendulum against the normal action of gravity and its tension is adjusted so that a slight increase in the total acceleration forces acting thereon in a direction to rotate the pendulum counterclockwise about axis 32 will rotate the pendulum to close port 23. A pin 37 on the plates 26 and 27 defines a limiting position for the respective element 33 in which the same blocks passage of air through the associated port 23. While the opposite pendulums 25 are fixed on a common shaft, each of the normally ineffective pendulously supported movable pendulums or levers 33 preferably operates as a single entity to close that port 23 which is opened by centrifugal force as the airplane turns one way or the other.

The erection control devices disclosed operate in the following manner. When, for example, the moving airplane having an artificial horizon instrument therein, as shown in Fig. 1, makes a right turn, the instrument correspondingly changes its heading or direction of movement, and because of laterally exerted acceleration forces due to turning, the fore and aft flipper pendulums 25 of the erecting means swing so that the aft port 23 is opened while the fore port 23 is closed. Such action introduces an erroneous erecting movement of the gyro-vertical which is obviated by the provisions of the present invention. In the example utilized, the shutter 34 on gravitationally responsive lever 33 for the aft port 23, referring to Fig. 3, which is normally balanced in the position shown in the drawings by means of the spring 36 moves due to the increase in the total acceleration force normally acting thereon, against the action of the spring to assume a position against the limit pin 37. In this temporary position, which endures as long as the moving force conditions affecting the element 33 lasts, the shutter 34 of the pendulously supported element 33 closes the aft port 23. Thus, in the example described, there is no erroneous erection about the bank axis of the artificial horizon instrument.

The increase in force affecting the control elements 33 is due to a change in heading or velocity of the gyroscopic instrument. Spring 36 normally maintains the element 33 against the force of gravity in its inoperative position as shown in Fig. 3. When the element is affected by lateral acceleration, an increase in the total force thereon is obtained which is the vector resultant of the gravitational and lateral forces affecting the device, the same then being of sufficient magnitude to overcome the counterbalancing effort of the spring 36 and obtain the required movement of the element to temporarily block the reactive air jet. With reference to Fig. 10, a horizontally or laterally directed force such as is effective to cause operation of the device is designated at 71, the same combining with the force due to gravitational acceleration, as indicated at 72, to obtain a resultant force 73 of increased magnitude to move the control member. The center of gravity of the pendulous control members shown in both forms of the invention is considerably to the left (or right) and slightly below their respective pivot axes 32 and 31 respectively, in order to assure that this relatively small increase in force is effective through a large enough lever arm to move the members. The preferred design is to locate the center of gravity C on a line AB passing through pivot 32 and downwardly inclined at an angle corresponding to the angle of banked turn at which the pendulous shutter 34 is desired to become operative.

In the modification of this form of the invention shown in Figs. 11 and 12, the fore and aft pendulums (not shown) operate in the usual manner on the outside of the erector casing 24. A light shaft 83 is pivotally mounted within the casing, the same carrying a drum or pulley 83' supporting a weight 84 by means of a cord or other flexible connecting element 85 therebetween which is partly wound around the pulley 83'. The construction is such that the weight 84 is free to swing and exerts a torque on the shaft 83 at a constant lever arm equal to the radius of the pulley. The normal turning moment of the weight is spring balanced, as by means of a hairspring 86 anchored at one end to casing 24 and at the other end to a disc 83' on shaft 83. In the construction shown, two paddle-type vanes 87, which are rigidly fastened to the shaft 83, are arranged to cover either one or the other of fore and aft erector ports 23 when the device is subjected to turning acceleration in one direction or the other as heretofore described. This condition is represented by the dotted lines in Fig. 11, showing the respective positions of the weight 84 and one of paddles 87 during a turn to the right.

With reference to Figs. 6 to 9 inclusive, a modified form of the invention is shown in which the same is adapted to control an electromagnetically erected gyro-vertical instrument. In Fig. 6, the rotor bearing casing is indicated at 40, the same being universally mounted about major and minor axes 81 and 82 by means of gimbal ring 41 which is pivotally supported on stationary upright pieces 42 and 43 extending from the base 44. In the form of the invention shown, a spherically shaped electrical conductor or inductor cup 45 is mounted on a stem 46 which extends downwardly from the rotor bearing case 40 of the gyro-vertical. Stator structure 47, by means of which a moving magnetic field is produced, is mountd on the fixed base 44. This structure is preferably cruciform in shape and comprises five poles 48 whose external faces are spaced from and curved to conform to the exterior spherical surface of the cup-like inductor 45. In the instant case, three phase current is supplied to the poles through leads 49, 50 and 51 and only the winding on the center pole 48 is continuously excited from one phase of the supply. The supply to the other poles is under the control of gravitationally responsive means in the form of independently mounted pendulums 52 and 53. Pendulum 52 depends freely from a pivotal mounting on the fore and aft axis or major axis of the gyro-vertical. Pendulum 53 is similarly situated at the athwartship or minor axis of the gyroscope. As shown, the pendulums each carry a trolley or brush 54 and 55 which respectively cooperate with the reversing contact members 55' and 56 carried by the gimbal ring 41 and 57 and 58 carried by the rotor bearing case 40. The pendulums 52 and 53 are arranged in quadrature with respect to the poles of the stator structure. The trolleys and reversing contacts indirectly control the current supply to the pole windings through relays 59 and 60. In the instant case the windings on the pole pieces are Y-connected and the relays operate to reverse the connections to two of the lead-in wires so that the direction of the linking flux between three in-line pole pieces is reversed. In this manner the magnetic flux always extends across three poles so that the system remains effective through large angles of tilt of the rotor bearing casing 40. The erecting means for the gyro-vertical described consists of the device shown for electrically producing a transversely moving magnetic field and the electrical conductor inductively associated with the same. The directing gravitationally responsive means is provided by the pendulums 52 and 53 and the parts controlled by the same.

In the present form of the invention, control over the erecting means is obtained by further gravitationally responsive means by which the circuit for the device for electrically producing the moving magnetic field is temporarily opened when the conditions affecting the instrument are similar to those heretofore described. This is obtained, in the instant case, by the pivotally mounted, open end tubular shaped pendulous body member 70, Fig. 7. Two of such members 70, whose axes 71 are arranged in parallel relation to the respective axes 81 and 82 of the gyroscope, may be employed to obtain the desired control of the erecting emans as it influences the gyro-vertical about both its major and minor axes, although for most purposes only the controller affected by turning need be employed. The control members 70 are placed in any desirable position in the airplane, either at a distance from the gyroscopic instrument or, if desired, the members 70 may be suitably constructed so as to form a part of the instrument, but are preferably not stabilized by the gyroscope as is the case with pendulums 33 in Figs. 1 to 4 but are free to swing so as to assume a natural position under the combined acceleration forces of gravity and those due to turning or change of speed. The member 70 includes a leaf spring arm, switch forming, member 61, whose normal position, as shown in Fig. 7, is one in which the movable end of the arm sets against contact 62 so that the switch is closed. A damped piston element 63 is joined to the lower portion of the strip or leaf spring arm 61 by means of rod 64. A yielding member or spring 65 supports the piston forming element 63 within the damping fluid contained in the tubular member 70 so that the force of gravity on the piston is just insufficient to overcome the combined tension of the coil spring 65 and arm 61. However, when the body member is subject to a lateral acceleration force it becomes tilted as shown in Fig. 8 and the resultant force is sufficient to lower the piston member against the combined action of the spring 65 and leaf spring 61 so that the free end of the switch forming spring breaks the contacts 62 and may make temporary contact with a limit pin 66, thereby opening the circuit to the erecting means and consequently affects the erection control of the instrument in a similar manner to that heretofore described.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In a gyro-vertical having a rotor bearing case, means for universally supporting said case on horizontal axes, air jet means for erecting said case and gravitationally responsive means for controlling the erecting effort of the same, a second gravitationally responsive means, a spring balancing said last-named means in a normal inoperative position against the force of gravity, and adapted to be moved by an increase in the total force thereon to block temporarily said air jet erecting means.

2. A gyro-vertical for artificial horizon instruments including a rotor case, means for universally supporting said case on horizontal axes, air jet means for erecting said instrument and gravitationally responsive means for controlling the erecting effort of the same, an auxiliary pendulously supported element, and a spring for biasing the same to a normally ineffective position and movable, by a force due to the lateral acceleration thereof, to an effective position to block said air jet erecting means for the duration of the effectual force of acceleration thereon.

3. A gyro-vertical for artificial horizon instruments comprising a rotor case, means for universally supporting said case on horizontal axes, air jet means for erecting said case and gravitationally responsive means for controlling the erecting effort of the same, a pendulous control element, a spring connected thereto by which the same is maintained in a normally inoperative position against the force of gravity, and a shutter on said pendulous element movable by an increase in the normal force affecting the control element to an operative position in which the same temporarily blocks said air jet erecting means.

4. A gyro-vertical for artificial horizon instruments comprising a rotor case, means for universally supporting said case on horizontal axes, an erector case having ports from which air jets issue to provide the erecting means for the gyrovertical, pendulous shutters, for each of the ports, mounted exteriorly of the erector case, for controlling the erecting effort of the air jets, and auxiliary pendulums for the ports, situated within the erector case, a spring connected to each by which the same are respectively maintained in a normally inoperative position, with relation to the ports, against the force of gravity, movable by an increase in the total force affecting the same to an operative position to temporarily prevent the issuance of air from given ports in the erector case.

5. In a gyroscope having three degrees of freedom, normally operative torque exerting means for maintaining the gyroscope erect including gravitationally responsive means for controlling said torque means, a second gravitationally responsive means, a spring balancing the same in a normally inoperative position against the force of gravity, and means responsive to a downward movement of said second gravitational means from its normal position for rendering said torque means temporarily inoperative.

6. A gyroscope, as claimed in claim 5, in which the erecting means consists of a device for electrically producing a transversely moving magnetic field and an inductive conductor associated therewith.

7. A gyroscope, as claimed in claim 5, in which the erecting means consists of a device for electrically producing a transversely moving magnetic field and an inductive conductor associated therewith, and the second gravitationally responsive means is a switch controlling pendulous body by which the feed circuit for the device for electrically producing the moving magnetic field is opened when the body is in an operative position.

8. A gyroscope, as claimed in claim 5, in which the erecting means consists of a device for electrically producing a transversely moving magnetic field and an inductive conductor associated therewith, and the second gravitationally responsive means is an open end tubular shaped pendulous body having a leaf spring arm electrical switch member mounted thereon, the operation of which, in opening a feed circuit for the device for electrically producing the moving magnetic field, is controlled by a yieldably supported damped piston forming member situated within the tubular shaped pendulous body.

9. A gyroscope as claimed in claim 5, in which the second gravitational device is operative through a constant lever arm.

10. A gyroscope erecting means as claimed in claim 5, in which said second gravitationally responsive means comprises a spring-supported mass pivoted independently of the gyroscope so as to assume a natural bank angle.

11. A gyroscope erecting means as claimed in claim 5, in which said second gravitationally responsive means comprises a pendulous device pivoted on the gyroscope and spring biased to normally maintain the center of gravity lifted to one side of its pivot, whereby, upon increase in the total acceleration forces acting thereon, the center of gravity is lowered against the spring.

12. A gyroscope erecting means as claimed in claim 5, in which said second gravitationally responsive means comprises two pendulous devices pivoted on the gyroscope, and a spring connected to each to normally maintain the center of gravity of each slightly lifted against a stop in opposite directions around their respective pivots, whereby a lateral acceleration force acting thereon in one direction moves one pendulum to render said torque means inoperative, and an opposite acceleration force moves the other pendulum for such purpose.

13. In a gyro-vertical having a normally operative erection device for erecting the same upon tilt, a pendulum, a spring connected to said pendulum normally biasing the same to a position in which its center of gravity is slightly to one side of and below its point of support, whereby an increase in the total acceleration forces acting thereon moves it against said spring to a second position, and means responsive to such movement for temporarily rendering said erection device inoperative.

14. Pendulum controlled jet erection means for a gyroscopic artificial horizon, having a rotor bearing casing supported for oscillation about horizontal axes and having a normally vertical position, of the kind including a pair of oppositely positioned fore-and-aft ports, through which jets are adapted to be directed to exert erecting torques on said casing about its lateral axis, erection pendulums adjacent said jet ports for altering the relative strengths of said torques upon inclination of said casing, and turn-responsive means for preventing the development of opposed torques of different values in response to turns of the craft, characterized in that said turn-responsive means comprises shutter means individually operable with respect to each of said ports, means being provided whereby only such shutter means are operated in response to turn as are associated with the jet port whose erection pendulum is moved in an opening direction.

15. In a gyro-vertical for aircraft having a rotor bearing case, means for universally supporting said case in a normally vertical position on fore-and-aft and laterally positioned, normally horizontal axes, air jets acting about the lateral axis for erecting said case about its fore-and-aft axis, and gravitationally responsive means for governing the effective torque exerted by said jets about said lateral axis, a second means pendulously pivoted adjacent each of said jets, and balanced in normally inoperative positions, one being displaced by a turn in one direction to block the jet uncovered by the gravitational means, and the other being displaced by a turn in the opposite direction to block the jet uncovered by the other gravitational means.

16. Means for improving the gravity control of a universally mounted gyroscope by pendulous shutters and air jets operating to erect the same comprising four quadrantally arranged mechanisms each of which consists of a lever, a horizontal pivot for said lever, a mass mounted on said lever eccentrically to said pivot, an abutment for said lever, a spring connected to said lever to overbalance said mass and hold said lever in inclined position lightly against said abutment to prevent displacement of said lever in any attitude due to the force of gravity but leaving said lever free to be displaced by a horizontal acceleration force acting on the gyroscope in one direction when said force exceeds a predetermined minimum, and an extension on said lever forming an auxiliary shutter disposed to cooperate with one of said air jets when said lever is displaced from its abutment by such horizontal acceleration force to reduce the flow through such jet and thereby limit the effect of the pendulous shutter cooperating therewith.

FREDERICK D. BRADDON.
SPENCER KELLOGG, 2ND.